US011132819B2

(12) United States Patent
Cho et al.

(10) Patent No.: US 11,132,819 B2
(45) Date of Patent: Sep. 28, 2021

(54) METHOD AND APPARATUS FOR DECODING MULTI-VIEW VIDEO INFORMATION

(71) Applicant: KONKUK UNIVERSITY INDUSTRIAL COOPERATION CORP, Seoul (KR)

(72) Inventors: Yong Beom Cho, Seoul (KR); Ki Seung Lee, Seoul (KR)

(73) Assignee: KONKUK UNIVERSITY INDUSTRIAL COOPERATION CORP, Seoul (KR)

( * ) Notice: Subject to any disclaimer, the term of this patent is extended or adjusted under 35 U.S.C. 154(b) by 180 days.

(21) Appl. No.: 16/711,941

(22) Filed: Dec. 12, 2019

(65) Prior Publication Data

US 2020/0193646 A1 Jun. 18, 2020

Related U.S. Application Data

(63) Continuation of application No. PCT/KR2018/016934, filed on Dec. 28, 2018.

(30) Foreign Application Priority Data

Dec. 13, 2018 (KR) .......................... 10-2018-0160595

(51) Int. Cl.
*G06T 9/00* (2006.01)
*G06N 20/10* (2019.01)
(Continued)

(52) U.S. Cl.
CPC ............. *G06T 9/001* (2013.01); *G06N 20/10* (2019.01); *G06T 7/248* (2017.01); *G06T 7/50* (2017.01);
(Continued)

(58) Field of Classification Search
CPC ...... H04N 19/597; H04N 19/51; G06T 7/248; G06T 7/50; G06T 9/001;
(Continued)

(56) References Cited

U.S. PATENT DOCUMENTS 9,961,323 B2* 5/2018 Choi .................... H04N 19/187
2006/0023787 A1* 2/2006 Cai ........................ H04N 19/51
375/240.16

(Continued)

FOREIGN PATENT DOCUMENTS

EP 3151562 4/2017
JP 2014502443 1/2014
(Continued)

OTHER PUBLICATIONS

Korean Office Action—Korean Application No. 10-2018-0160595 dated Feb. 25, 2020, citing Ying C. et al., KR 10-2015-0038399, and EP 3151562.
(Continued)

*Primary Examiner* — Brenda C Bernardi
(74) *Attorney, Agent, or Firm* — Cantor Colburn LLP

(57) ABSTRACT

A decoding method of multi-view video information is provided. The decoding method of multi-view video information includes: receiving a bit stream about video data of a plurality of videos photographed by a plurality of cameras; generating first information by extracting depth information of a block in a video frame of a plurality of videos from video data included in the bit stream; generating second information by determining whether the same motion estimation is generated between video frames of the plurality of videos; generating third information by extracting pixel information of a block in the video frame of the plurality of videos; and performing block matching and disparity compensation between video frames of the plurality of videos by (Continued)

inputting the first information to third information to a disparity compensation model of multi-view video information which is generated by being trained in advance.

13 Claims, 9 Drawing Sheets

(51) Int. Cl.
  *G06T 7/50* (2017.01)
  *G06T 7/246* (2017.01)
(52) U.S. Cl.
  CPC ............... *G06T 2207/10016* (2013.01); *G06T 2207/20081* (2013.01); *G06T 2207/20228* (2013.01)
(58) Field of Classification Search
  CPC . G06T 2207/20228; G06T 2207/20081; G06T 2207/10016; G06N 20/10
  See application file for complete search history.

(56) References Cited

U.S. PATENT DOCUMENTS

2011/0261883 A1* 10/2011 Bang ...................... H04N 19/46
  375/240.13
2014/0139627 A1* 5/2014 Chen .................... H04N 19/176
  348/43
2017/0150179 A1* 5/2017 Park ..................... H04N 19/157

FOREIGN PATENT DOCUMENTS

| KR | 101432779 | 8/2014 |
| KR | 20150038399 | 4/2015 |

OTHER PUBLICATIONS

Ying C. et al., Test Model 11 of 3D-HEVC and MV-HEVC, ISO/IEC JTC 1/SC 29/WG 11, N15141, Feb. 2015.

Lee, et al., An Efficient Inter-sub Block Filtering for BVSP in 3D-HEVC, The Korean Society of Broad Engineers, 2013, pp. 351-353.

Lee, et al., Coding Technique using Depth Map in 3D Scalable Video Codec, The Korean Society of Broad Engineers, 2016, pp. 237-251.

Lee, et al., Efficient Motion Vector Coding Method for Multi-view Video Coding, The Institute of Electronics and Information Engineers, 2016, pp. 383-385.

Liu, et al., Learning based MV-HEVC Disparity Compensation, 30th Workshop on Image Processing and Image Understanding, 2018, pp. 2.7-2 9.

* cited by examiner

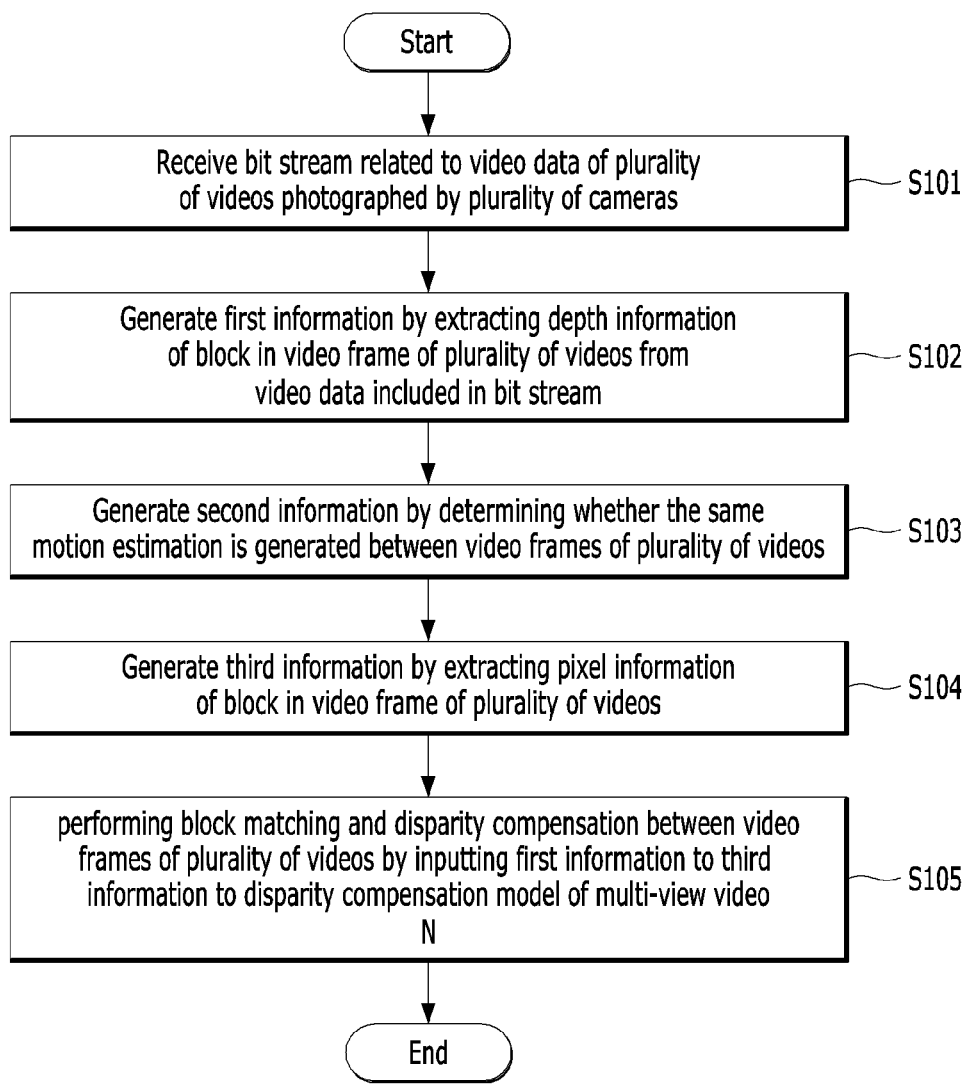

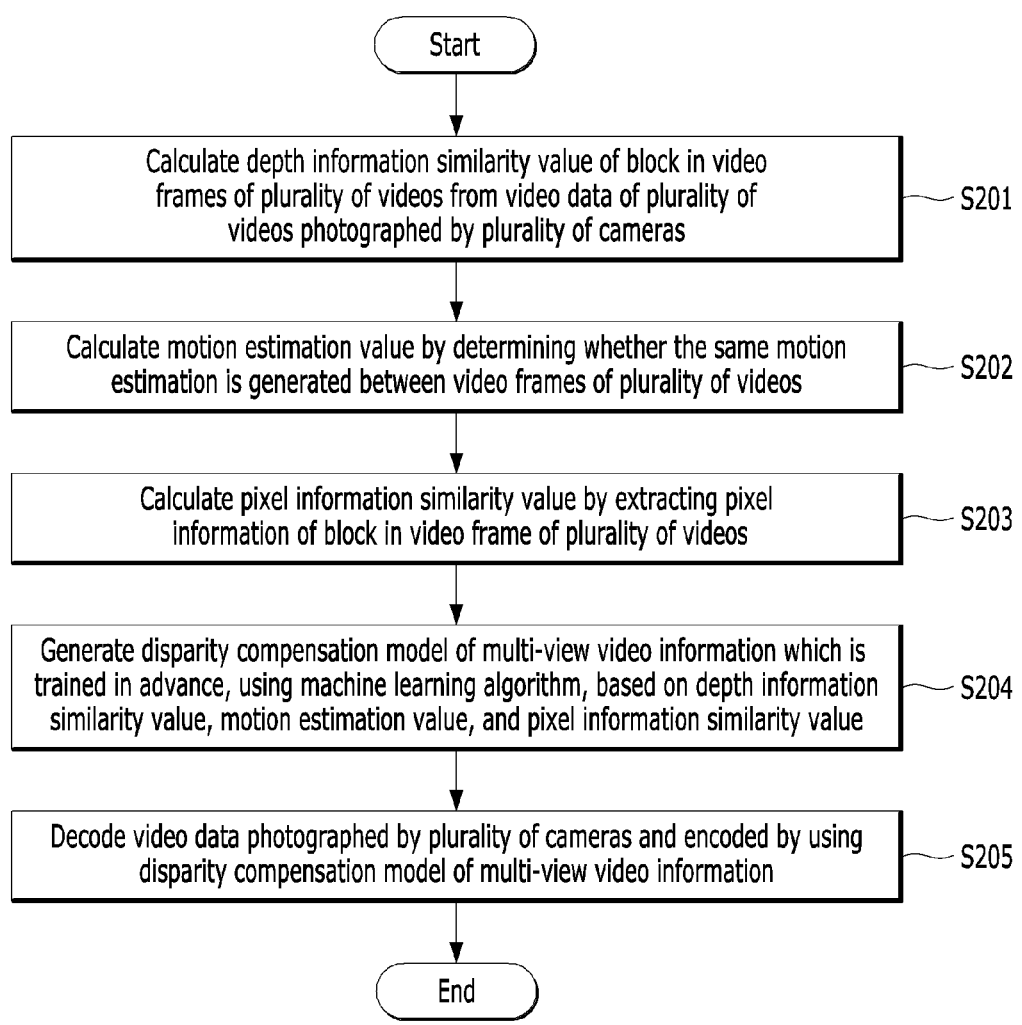

METHOD AND APPARATUS FOR DECODING MULTI-VIEW VIDEO INFORMATION

TECHNICAL FIELD

The present disclosure relates to a method and an apparatus for decoding multi-view video information.

BACKGROUND ART

At the 114-th (held on February of 2016) MPEG standardization meeting, it was reported that the verification test of MV-HEVC which is a scalable form of HEVC standard showed a data rate reduction of approximately 30% when compared to independent HEVC coding.

The multi-view video coding allows a user to freely select videos from the other view. The simplest structure of the multi-view video is a multi-view HEVC (MV-HEVC) which is a scalable form of HEVC.

Referring to FIG. 3A, the MV-HEVC has information of a plurality of sequences, which is different from the HEVC, so that not only motion estimation (ME) of a time axis, but also disparity estimation (DE) of a spatial axis is essential. The MV-HEVC has a higher compression efficiency through two estimations.

However, instead of achieving higher compression efficiency, it is difficult to perform the decoding in real time through the MV-HEVC. Specifically, it is impossible to decode four UHD level videos using a consumer-level computer. The reason is because when the more similar the videos, the more the data processed by the disparity estimation (DE) as illustrated in FIG. 3B. As a profiling result, the motion compensation (MC) and the disparity compensation (DC) occupy 90% or more of time of an MV-HEVC decoder. The more the multi-video views, the more the area occupied by the disparity compensation (DC) during the decoding process. For this reason, the shorter the time of the disparity compensation (DC) process, the better the performance of the MV-HEVC decoder.

A related art of the present disclosure is disclosed in Korean Registered Patent Publication No. 10-1432779.

DISCLOSURE

Technical Problem

The present disclosure is made to solve the above-described problem of the related art and to provide a method optimized for MV-HEVC using an SVM learning method to reduce time consumption for disparity compensation (DC).

However, objects to be achieved by various embodiments of the present disclosure are not limited to the technical objects as described above and other technical objects may be present.

Technical Solution

In order to achieve the above-described technical object, according to one embodiment of the present disclosure, a decoding method of multi-view video information includes: receiving a bit stream about video data of a plurality of videos photographed by a plurality of cameras; generating first information by extracting depth information of a block in a video frame of a plurality of videos from video data included in the bit stream; generating second information by determining whether the same motion estimation is generated between video frames of the plurality of videos; generating third information by extracting pixel information of a block in the video frame of the plurality of videos; and performing block matching and disparity compensation between video frames of the plurality of videos by inputting the first information to third information to a disparity compensation model of multi-view video information which is generated by being trained in advance.

According to one embodiment of the present disclosure, a decoding method of multi-view video information further includes: calculating a depth information similarity value by extracting depth information of a block in video frames of a plurality of videos from video data of the plurality of videos photographed by a plurality of cameras; calculating a motion estimation value by determining whether the same motion estimation is generated between the video frames of the plurality of videos; calculating a pixel information similarity value by extracting pixel information of the block in the video frame of the plurality of videos; and generating a disparity compensation model of multi-view video information which is trained in advance, using a machine learning algorithm, based on the depth information similarity value, the motion estimation value, and the pixel information similarity value.

According to one embodiment of the present disclosure, the machine learning algorithm may include a support vector machine (SVM).

According to one embodiment of the present disclosure, the depth information in the video frame of the plurality of videos may include size information of a coding unit (CU) from 64×64 to 8×8 of each block in the video frame or information about a tree structure.

According to one embodiment of the present disclosure, in the calculating of a motion estimation value by determining whether the same motion estimation is generated between video frames of the plurality of videos, when the prediction unit of the corresponding blocks between video frames is the same, it is determined that the same motion estimation between the video frames is generated to assign a predetermined motion estimation value.

According to one embodiment of the present disclosure, a decoding method of multi-view video information includes: calculating a depth information similarity value by extracting depth information of the block in video frames of a plurality of videos from video data of the plurality of videos photographed by a plurality of cameras; calculating a motion estimation value by determining whether the same motion estimation is generated between video frames of the plurality of videos; calculating a pixel information similarity value by extracting pixel information of the block in the video frame of the plurality of videos; generating a disparity compensation model of multi-view video information which is trained in advance, using a machine learning algorithm, based on the depth information similarity value, the motion estimation value, and the pixel information similarity value; and decoding the video data encoded by being photographed by the plurality of cameras using a disparity compensation model of the multi-view video information.

According to one embodiment of the present disclosure, the machine learning algorithm may include a support vector machine (SVM).

According to one embodiment of the present disclosure, the decoding of video data includes: receiving a bit stream about encoded video data photographed by a plurality of cameras; generating first information by extracting depth information of a block in a video frame of a plurality of videos from video data included in the bit stream; generating second information by determining whether the same motion estimation is generated between video frames of the plurality of videos; generating third information by extracting pixel information of a block in the video frame of the plurality of videos; and performing block matching and disparity compensation between video frames of the plurality of videos by inputting the first information to third information to a disparity compensation model of multi-view video information.

According to one embodiment of the present disclosure, a decoding apparatus of multi-view video information includes: a receiver which receives a bit stream about video data of a plurality of videos photographed by a plurality of cameras; a feature extracting unit which extracts feature information of a bit stream including depth information of a block in a video frame of a plurality of videos, information about motion estimation between video frames of the plurality of videos, and pixel information of a block in the video frame of the plurality of videos, from video data included in the bit stream; and a decoder which includes a disparity compensation model of multi-view video information generated by being trained in advance and performs block matching and disparity compensation between video frames of the plurality of videos by inputting the extracted feature information to the disparity compensation model.

According to one embodiment of the present disclosure, the disparity compensation model may be generated using a machine learning algorithm based on a depth information similarity value calculated by extracting depth information of a block in a video frame of a plurality of videos from video data of the plurality of videos photographed by the plurality of cameras, a motion estimation value calculated by determining whether the same motion estimation between video frames of the plurality of videos is generated, and a pixel information similarity value calculated by extracting pixel information of a block in the video frame of the plurality of videos.

According to one embodiment of the present disclosure, the feature extracting unit may include: a first information extracting unit which generates first information by extracting depth information of a block in a video frame of a plurality of videos from video data included in the bit stream; a second information extracting unit which generates second information by determining whether the same motion estimation is generated between video frames of the plurality of videos; and a third information extracting unit which generates third information by extracting pixel information of a block in the video frame of the plurality of videos.

According to one embodiment of the present disclosure, the machine learning algorithm may include a support vector machine (SVM).

The above-described solving means are merely illustrative but should not be construed as limiting the present disclosure. In addition to the above-described embodiments, additional embodiments may be further provided in the drawings and the detailed description of the present disclosure.

Advantageous Effects

According to the above-described solving means of the present disclosure, in order to reduce the time consumed for the disparity compensation (DC), the SVM learning method is used so that the MV-HEVC decoder may have better performance.

However, the effect which can be achieved by the present disclosure is not limited to the above-described effects, there may be another effects.

DESCRIPTION OF DRAWINGS

FIG. 7 is a first flowchart illustrating a flow of a decoding method of multi-view video information according to one embodiment of the present disclosure.

FIG. 8 is a second flowchart illustrating a flow of a decoding method of multi-view video information according to one embodiment of the present disclosure.

EXPLANATION OF REFERENCE NUMERALS AND SYMBOLS

Figure 1:
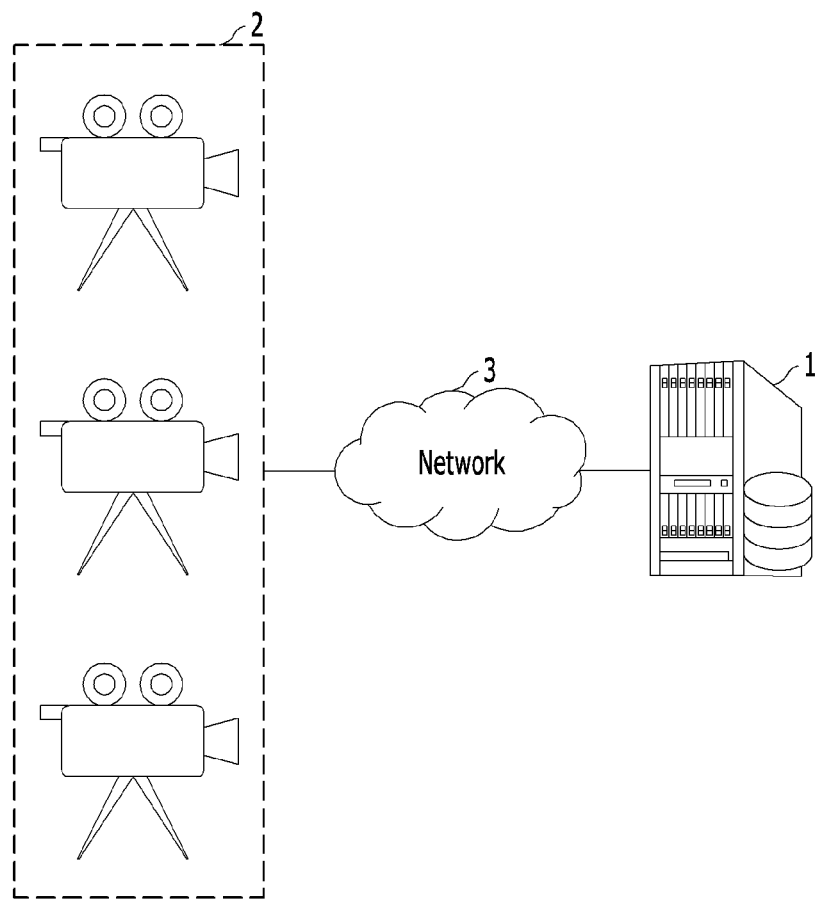
FIG. 1 is a view schematically illustrating a decoding system of multi-view video information according to one embodiment of the present disclosure.

1: Decoding apparatus of multi-view video information
10: Receiver
20: Feature extracting unit
21: First information extracting unit
22: Second information extracting unit
23: Third information extracting unit
30: Decoder

BEST MODE

Hereinafter, the present disclosure will be described more fully hereinafter with reference to the accompanying drawings, in which embodiments of the present disclosure are shown. However, the present disclosure can be realized in various different forms, and is not limited to the embodiments described herein. Accordingly, in order to clearly explain the present disclosure in the drawings, portions not related to the description are omitted. Like reference numerals designate like elements throughout the specification.

Throughout this specification and the claims that follow, when it is described that an element is "coupled" to another element, the element may be "directly coupled" to the other element or "electrically coupled" to the other element through a third element.

Through the specification of the present disclosure, when one member is located "on", "above", "on an upper portion", "below", "under", and "on a lower portion" of the other member, the member may be adjacent to the other member or a third member may be disposed between the above two members.

In the specification, unless explicitly described to the contrary, the word "comprise" and variations such as "comprises" or "comprising", will be understood to imply the inclusion of stated elements but not the exclusion of any other elements.

Figure 3A:
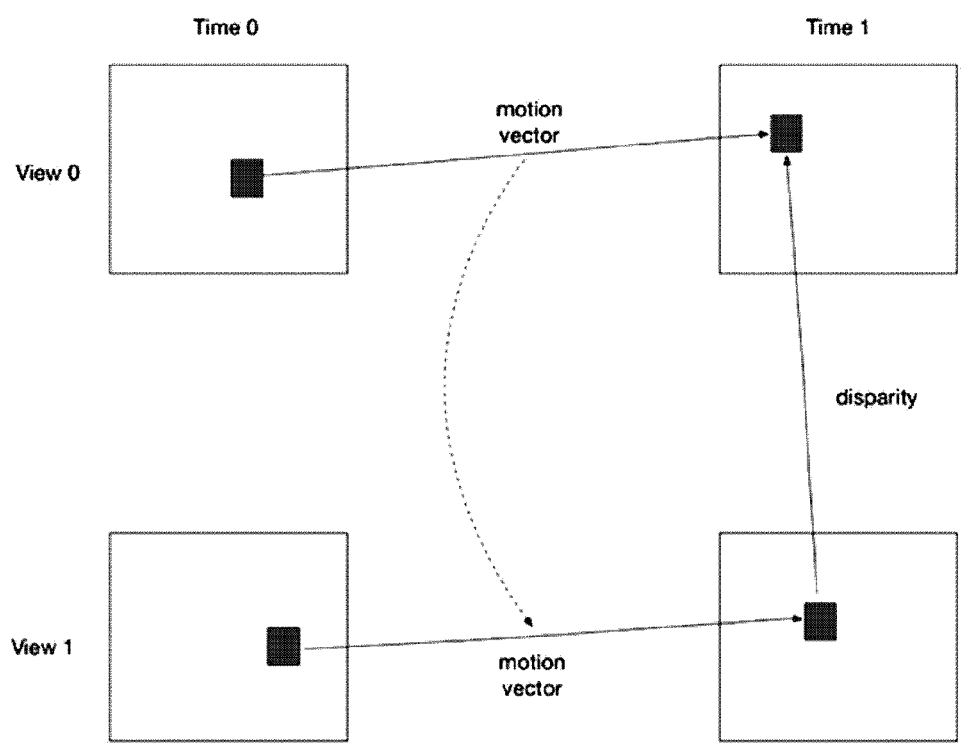
FIG. 3A is a view for explaining motion estimation of MV-HEVC of a decoding apparatus of a multi-view video information according to one embodiment of the present disclosure.
Figure 3B:
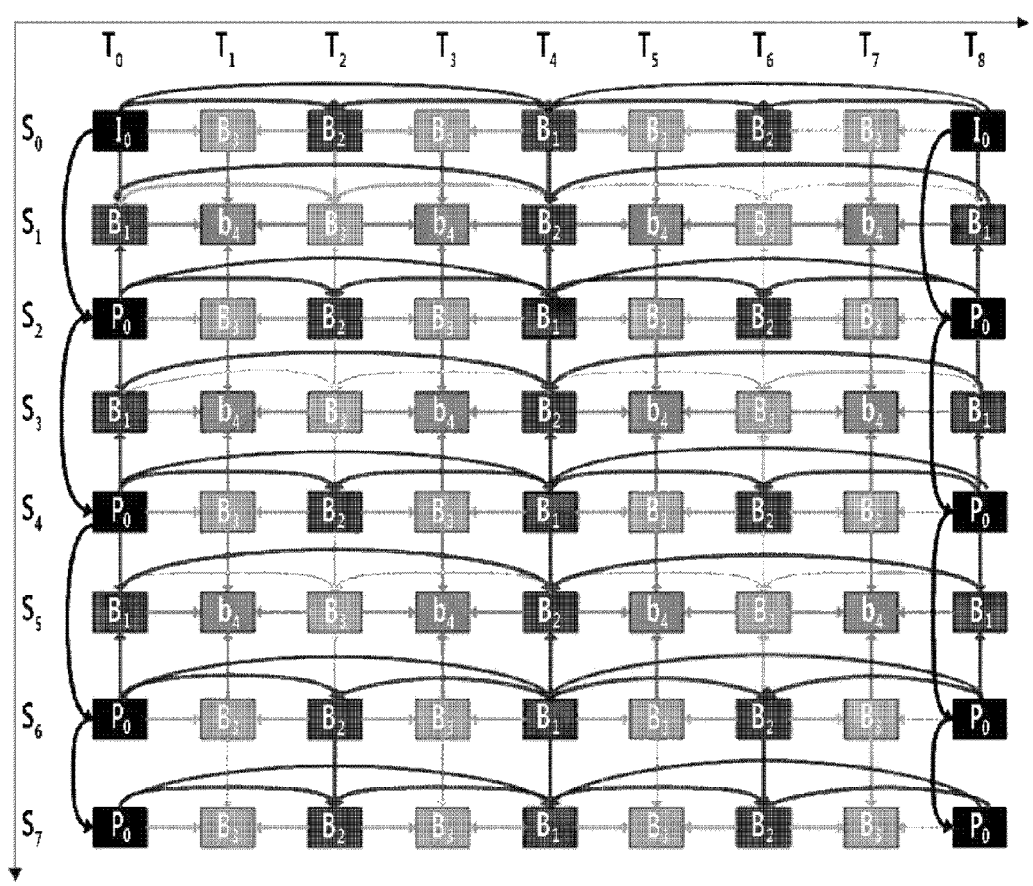
FIG. 3B is a view for explaining a predicting method between frames in multi-view video coding of a decoding apparatus of multi-view video information according to one embodiment of the present disclosure.

FIG. 3A is a view for explaining motion estimation of MV-HEVC of a decoding apparatus of a multi-view video information according to one embodiment of the present disclosure. FIG. 3B is a view for explaining a predicting method between frames in multi-view video coding of a decoding apparatus of multi-view video information according to one embodiment of the present disclosure.

Referring to FIG. 3A, multi-view video information is a field of three-dimensional (3D) video processing which geometrically corrects and spatially composes videos photographed by one or more cameras to provide various views in various directions to the user. Generally, according to a multi-view high efficiency video coding (multi-view HEVC) process, when an actual scene is captured using two or more cameras to encode multi-view video (MVV) sequences and then a bit stream is transmitted to MV-HEVC through a receiver and a decoding process is performed thereon, a 3D video may be displayed. During this process, videos captured at a plurality of views to generate a stereoscopic video have a vast amount of data. Therefore, when a network infrastructure and a terrestrial bandwidth for implementing the stereoscopic video are considered, even though compression is performed using single-view video coding such as MPEG-2 or H.264/AVC or an encoding apparatus optimized for conventional MVV compression, there are many limitations in implementation.

Referring to FIG. 3B, a most frequently used prediction structure for multi-view video encoding is I-B-P-B-P structure at a view axis and a hierarchical B screen for prediction at a time axis. FIG. 3B illustrates a time-space prediction structure using a hierarchical B screen. Sn denotes a camera at an n-th view and Tn denotes a n-th screen with respect to the time. An arrow denotes a reference relationship between screens. The encoding for time-space prediction structure is separately performed at every view. In the I-B-P-B-P structure, S0 at a view I is encoded first and S2 at a view P is encoded using a restored video of S0. Similarly, S1 at a view B is encoded using restored videos of S0 and S2. In the multi-video, the disparity estimation (DE) is a process of measuring a redundancy between frames.

An object of the present disclosure is to provide a decoding method of multi-view video information to easily perform the decoding during the decoding process by finding a block in which the disparity estimation DE is performed using a machine learning algorithm.

Figure 2:
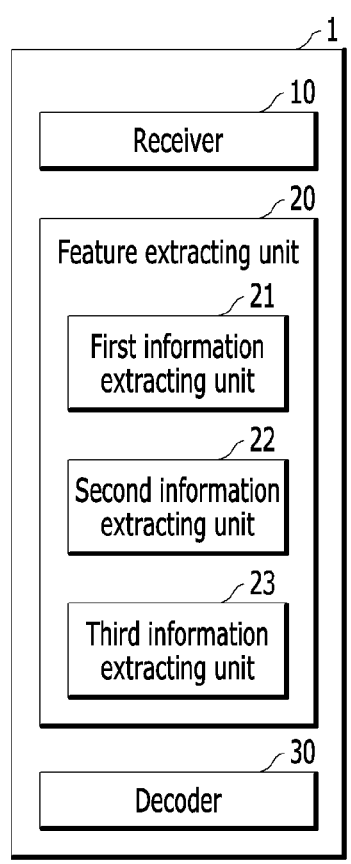
FIG. 2 is a schematic block diagram of a decoding apparatus of multi-view video information according to one embodiment of the present disclosure.

FIG. 1 is a view schematically illustrating a decoding system of multi-view video information according to one embodiment of the present disclosure. FIG. 2 is a schematic block diagram of a decoding apparatus of multi-view video information according to one embodiment of the present disclosure. FIG. 7 is a first flowchart illustrating a flow of a decoding method of multi-view video information according to one embodiment of the present disclosure.

Referring to FIGS. 1, 2, and 7, a decoding method of multi-view video information according to one embodiment of the present disclosure may include a step S101 of receiving a bit stream for video data of a plurality of videos photographed by a plurality of cameras 2, a step S102 of generating first information by extracting depth information of a block in a video frame of the plurality of videos from video data included in the bit stream, a step S103 of generating second information by determining whether the same motion estimation is performed between video frames of the plurality of videos, a step S104 of generating third information by extracting pixel information of the block in the video frame of the plurality of videos, and a step S105 of performing block matching and disparity compensation between video frames of the plurality of videos by inputting the first information to third information to a disparity compensation model of multi-view video information generated by being trained in advance.

Referring to FIG. 1, the decoding system 100 of multi-view video information may include a decoding apparatus 1 of multi-view video information and a plurality of cameras 2. The decoding apparatus 1 of multi-view video information may include a receiver 10, a feature extracting unit 20, and a decoder 30. Further, the feature extracting unit 20 may include a first information extracting unit 21, a second information extracting unit 22, and a third information extracting unit 23. However, the decoding apparatus 1 of multi-view video information is not limited to those described above. For example, the decoding apparatus 1 of multi-view video information may include an encoding apparatus (not illustrated) of multi-view video information and a user terminal (not illustrated).

The decoding system 100 of multi-view video information may further include a broadcasting server and device and a device for receiving a broadcasting signal propagated from a broadcasting station. Some of components of the decoding system 100 of multi-view video information may be equipped in one device or server. For example, the decoding apparatus 1 of multi-view video information and the user terminal 300 may be included in one device.

The plurality of cameras 2 may be video cameras which photograph videos in a plurality of locations. For example, the plurality of video cameras 2 may be video cameras which photograph a plurality of regions or people in a wide range of places such as stadiums or concert halls. For example, as the arrangement of the plurality of cameras 2, a one-dimensional parallel arrangement, a two-dimensional parallel arrangement, or a one-dimensional arrangement may be used and the video cameras may photograph videos in locations with a predetermined interval. The video camera may include a camera which is capable of photographing videos, such as a binocular camera, a camera using a parallel rig, or a camera using a mirror rig. The plurality of cameras 2 may be video cameras which are provided in different locations to photograph one object. The decoding apparatus 1 of multi-view video information may receive videos photographed by the plurality of cameras 2 through a network 3. Further, the decoding apparatus 1 of multi-view video information may receive the broadcasting signal propagated from the broadcasting server and device and the broadcasting station through the network 3.

In step S101, the receiver 10 may receive a bit stream related to video data of the plurality of videos photographed by the plurality of cameras 2. For example, the receiver 10 may receive a bit stream related to video data of the plurality of videos photographed by the plurality of cameras 2 from an encoding apparatus (not illustrated) of multi-view video information. The encoding apparatus (not illustrated) of multi-view video information may convert video data of the plurality of received videos into bit streams. The plurality of videos may be videos acquired from the plurality of cameras 2 provided in different locations. In other words, the plurality of videos may be videos obtained by photographing one object in different locations. That is, the plurality of videos may be videos obtained by photographing the same object at the same view.

The bit stream is stored in accordance with an encoding type which satisfies the constraints of an encoder. The MPEG requires syntax and semantics as constraints of the bit stream. The syntax indicates a data structure, a data format, and a data length and also indicates a represented order of the data. That is, the syntax is provided to satisfy the grammar for an encoding/decoding operation and defines an order of elements included in the bit stream, a length of each element, and a data format. The semantics refers to the meaning of each bit which configures the data. That is, the semantics indicates the meaning of each element in the bit stream. Therefore, various types of bit streams may be generated in accordance with an encoding condition of the encoder or an applied standard (or a CODEC). Generally, each standard such as MPEG-1, MPEG-2, MPEG-4, and MPEG-4 AVC has different bit stream syntax. Therefore, the bit stream which is encoded in accordance with the standard or the encoding condition may be considered to have different formats (that is, syntax and semantics) and in order to decode the corresponding bit stream, a decoder corresponding to the encoder needs to be used.

Figure 4:
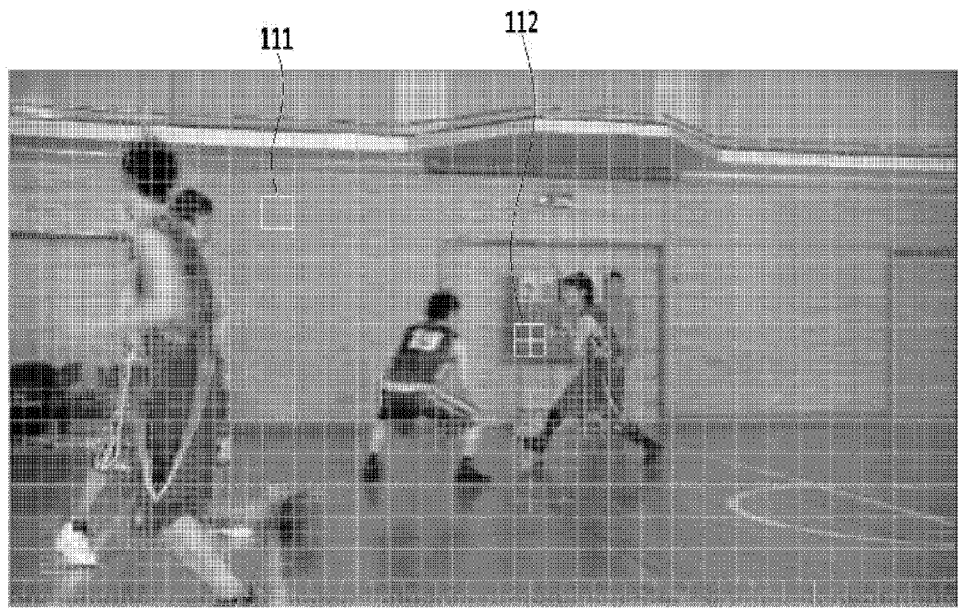
FIG. 4 is a view for explaining generation of first information by a decoding apparatus of multi-view video information according to one embodiment of the present disclosure.

FIG. 4 is a view for explaining generation of first information by a decoding apparatus of multi-view video information according to one embodiment of the present disclosure.

In step S102, the first information extracting unit 21 may generate the first information by extracting depth information of a block in video frames of a plurality videos from video data included in the bit stream. For example, the first information extracting unit 21 may generate the first information by extracting depth information of a block in video frames of a plurality videos from video data included in the bit stream received from the encoding apparatus (not illustrated) of multi-view video information. The first information may be generated by a depth information similarity value which is calculated by extracting the depth information of the block in the video frame of the plurality of videos from video data of a plurality of videos photographed by the plurality of cameras.

For example, referring to FIG. 4, a plurality of blocks may be included in video frames of the plurality of videos. The plurality of blocks may have different depths. The depth may vary in a portion with a high complexity of a screen content and a portion with a low complexity. For example, a region 111 such as a background has a small (low) depth because of a low complexity of screen content. Further, a region 112 having a lot of motions may have a large depth because of a high complexity of the screen content. The first information extracting unit 21 may extract depth information of the region 112 having a lot of motions which is depth information of a block in a video frame of a first video photographed by a first camera and the region 112 having a lot of motions which is depth information of a block in a video frame of a second video photographed by a second camera to generate first information.

According to one embodiment of the present disclosure, the depth information in the video frame of the plurality of videos may include size information of a coding unit (CU) from 64×64 to 8×8 of each block in the video frame or information about a tree structure. The coding tree unit (CTU) is a hierarchical coding structure used for high efficiency video coding (HEVC) which is a video compression technique. An existing macro block which is a basic unit of compression has a fixed size of 16×16 pixels, but the CTU supports a variable size which varies to 16×16 pixels, 32×32 pixels, and 64×64 pixels to increase a compression efficiency. The CTU is configured by a luma coding tree block (CTB) and a chroma CTB. One CTB is divided into coding units (CU) again and the CU is divided into a prediction unit (PU) and a transform unit (TU). The PU is an intra or inter prediction unit and the TU is a frequency transform and quantization unit. Generally, it is effective to encode a high resolution video using a large CTU such as 64×64 pixels and a low resolution video using a CTU with 16×16 pixel size which is the same as the existing macro block.

The block size of the coding unit (CU) may have size information from 64×64 to 8×8 in the HEVC standard. That is, a small block is used for a portion having a high complexity of screen content to perform detailed processing and a large size block is used for a portion having a lower complexity of screen content. For this reason, the first information extracting unit 21 may identify which part of one frame is this portion using the coding unit (CU) block size. In other words, the first information extracting unit 21 may determine that areas having a similar coding unit (CU) size of the multi-video have similar disparity estimation DE of a spatial axis.

In other words, the first information extracting unit 21 may extract depth information of a block in a video frame of a plurality of videos from video data of a plurality of videos photographed by the plurality of cameras 2 to calculate a depth information similarity value. For example, the first information extracting unit 21 may extract depth information of a first block in a video frame of a video from video data of the first video photographed by a first camera among the plurality of cameras. The first information extracting unit 21 may extract depth information of a second block in a video frame of a video from video data of the second video photographed by a second camera among the plurality of cameras.

For example, the video data of the first video may include data obtained by photographing a first object in a first location by the first camera. Further, the video data of the second video may include data obtained by photographing a second object in a second location by the second camera. The video data of the first video and the video data of the second video may be videos photographed at the same timing. The first information extracting unit 21 may calculate a similarity value of the depth information of the first block and the depth information of the second block. When the similarity value between the depth information of the first block and depth information of the second block is equal to or higher than a predetermined reference value, the first information extracting unit 21 determines that the corresponding blocks are similar. For example, referring to FIG. 4, the first information extracting unit 21 compares the depth information (for example, the region 112 having a lot of motions) of the first block of the video data of the first video and the depth information (for example, the region 112 having a lot of motions) of the second block of the video data of the second video and calculates a depth information similarity value to generate the first information.

Figure 5:
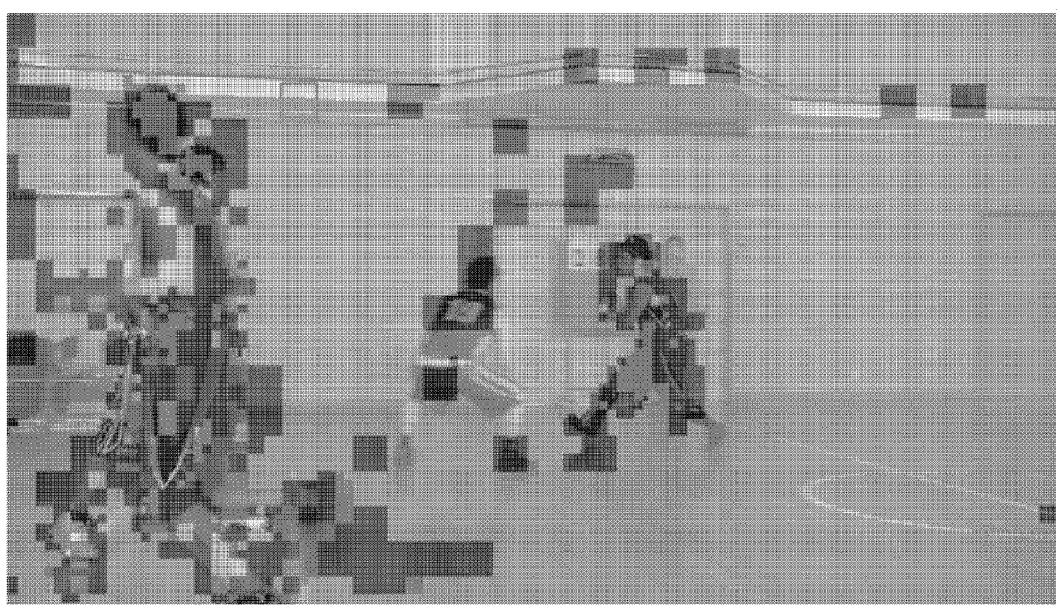
FIG. 5 is a view for explaining generation of second information by a decoding apparatus of multi-view video information according to one embodiment of the present disclosure.

FIG. 5 is a view for explaining generation of second information by a decoding apparatus of multi-view video information according to one embodiment of the present disclosure.

In step S103, the second information extracting unit 22 may determine whether the same motion estimation between video frames of the plurality of videos is generated to generate second information. For example, the second information may be generated from a motion estimation value calculated by determining whether the same motion estimation between video frames of the plurality of videos is generated. The second information extracting unit 22 may determine whether the same motion estimation is generated between a video frame photographed at a first timing and a video frame photographed at a second timing from the first camera. In this time, the first timing may be earlier than the second timing. Further, the second information extracting unit 22 may determine whether the same motion estimation is generated between a video frame photographed at a first timing and a video frame photographed at a second timing from the second camera. Further, the second information extracting unit 22 may determine whether the same motion estimation is generated by comparing the first video frame acquired from the first camera and the second video frame acquired from the second camera at the first timing.

In other words, the second information extracting unit 22 may determine whether the same motion estimation between video frames of the plurality of videos is generated to calculate a motion estimation value. During the video coding, a motion vector (MV) may identify a position of matching prediction unit (PU) in a reference frame. In the HEVC, the motion vector (MV) is deliberately improved to represent a motion between adjacent frames. Therefore, when the prediction units PU of the corresponding coding units (CU) of two videos are the same, a possibility of the same coding unit (CU) may be high. In other words, when the prediction units PU of blocks (coding units: CU) of two videos acquired at different timings are the same, a possibility that two videos acquired at different timings are the same block CU (coding unit) may be high. The second information extracting unit 22 may determine whether the same motion estimation between video frames of the plurality of videos acquired at different timings is generated to calculate a motion estimation value of the corresponding blocks.

According to one embodiment of the present disclosure, when the prediction units of corresponding blocks between video frames are the same, the second information extracting unit 22 determines that the same motion estimation between video frames is generated to assign a predetermined motion estimation value. In other words, when the prediction units of the corresponding first blocks between a first video frame acquired at a first timing and a second video frame acquired at a second timing are the same, the second information extracting unit 22 determines that the same motion estimation between the first video frame and the second video frame is generated to assign a predetermined motion estimation value.

The second information extracting unit 22 may confirm that an area where motion estimation (ME) of a time axis is generated means a motion of an object in a time domain. When the same motion estimation of the time axis is generated in two frames of a multi video, it may be determined that a possibility of generating disparity estimation (DE) of a spatial axis of the area is high.

For example, referring to FIG. 5, in an area where an object moves, many motion estimations (ME) of the time axis are generated. It is confirmed that a region where people (object) moves is colored by a different color from that of the background region. This means that the motion estimation of the time axis is generated in an area (region) where an object moves.

In step S104, the third information extracting unit 23 may generate the third information by extracting pixel information of a block in video frames of a plurality videos. In other words, the third information extracting unit 23 may calculate a pixel information similarity value by extracting pixel information of a block in video frames of a plurality videos. When the pixel information (pixel values) of the block in the video frame of the plurality of videos is the same, the third information extracting unit 23 may determine that the possibility of motion estimation (disparity estimation: DE) of a spatial axis in the corresponding area is high. In other words, the third information extracting unit 23 extracts pixel information of a first block in a video frame of a video acquired from the first camera and pixel information of a second block in a video frame of a video acquired from the second camera to determine whether the pixel information is the same. When the pixel information of the first block and the pixel information of the second block match, the third information extracting unit 23 may determine that the corresponding regions (first block and second block) are the same area.

According to one embodiment of the present disclosure, the third information extracting unit 23 may extract pixel information of a region which is divided into a plurality of blocks for every video frame. The third information extracting unit 23 may calculate a pixel information similarity value by extracting pixel information corresponding to a first region of a block in video frames of a plurality videos.

In step S105, a disparity compensating unit (not illustrated) inputs first information to third information to a disparity compensation model 31 of multi-view video information generated by being trained in advance to perform block matching between video frames of the plurality of videos and disparity compensation. For example, the disparity compensating unit (not illustrated) may perform block matching between video frames of the plurality of videos and perform the disparity compensation with information obtained by extracting first information to third information from the video data of the plurality of videos photographed by the plurality of cameras as an input. The disparity compensating unit (not illustrated) may perform the disparity compensation using the disparity compensation model 31 of multi-view video information which is already trained during the process of performing disparity compensation.

According to one embodiment of the present disclosure, the disparity compensation model 31 may be generated using a machine learning algorithm based on a depth information similarity value, a motion estimation value, and a pixel information similarity value. In other words, the disparity compensation model 31 may be generated using the machine learning algorithm based on a depth information similarity value calculated by extracting depth information of a block in a video frame of a plurality of videos from video data of the plurality of videos photographed by the plurality of cameras 2, a motion estimation value calculated by determining whether the same motion estimation between video frames of the plurality of videos is generated, and a pixel information similarity value calculated by extracting pixel information of a block in the video frame of the plurality of videos. In this case, the machine learning algorithm may include a support vector machine (SVM).

The support vector machine (SVM) is a supervised learning model for pattern recognition and data analysis as one of machine learning fields.

FIG. 8 is a second flowchart illustrating a flow of a decoding method of multi-view video information according to one embodiment of the present disclosure.

Hereinafter, a second flowchart illustrating a flow of a decoding method of multi-view video information according to one embodiment of the present disclosure will be described. However, the decoding method of multi-view video information relates to a decoding apparatus 1 of multi-view video information which performs a decoding method of multi-view video information according to one embodiment of the present disclosure described above and another embodiment so that the decoding method of multi-view video information may include the same or corresponding decoding method of multi-view video information according to one embodiment of the present disclosure described above and another embodiment. Therefore, the same or similar components to those described above may be denoted by the same reference numerals and a redundant description may be simplified or omitted.

In step S201, the first information extracting unit 21 may calculate a depth information similarity value of a block in a video frame of a plurality of videos from video data of a plurality of videos photographed by the plurality of cameras 2. For example, the first information extracting unit 21 may extract first information to be used as learning data of a disparity compensation model 31 of multi-view video information. In other words, the first information extracting unit 21 may extract depth information of a block in a video frame of a first video from video data of a first video photographed by a first camera. Further, the first information extracting unit 21 may extract depth information of a block in a video frame of a second video from video data of a second video photographed by a second camera. The first information extracting unit 21 may calculate the similarity value by comparing depth information of blocks of the same region of video data of the first video and video data of the second video photographed by the first camera and the second camera, respectively.

In step S202, the second information extracting unit 22 may determine whether the same motion estimation between video frames of the plurality of videos is generated to calculate a motion estimation value. For example, the second information extracting unit 22 may extract second information to be used as learning data of the disparity compensation model 31 of multi-view video information. The second information extracting unit 22 may determine whether the same motion estimation between video frames of the first video and the second video acquired at different timings is generated to calculate a motion estimation value. The second information extracting unit 22 may determine whether the same motion estimation between video frames of the first video acquired by the first camera at the first timing and the second video acquired by the second camera at the second timing is generated. Further, the second information extracting unit 22 may determine whether the same motion estimation in the same region (block) of the first video and the second video acquired at different timings is generated to calculate a motion estimation value.

In step S203, the third information extracting unit 23 calculates a pixel information similarity value by extracting pixel information of a block in video frames of a plurality videos. For example, the third information extracting unit 23 may extract third information to be used as learning data of the disparity compensation model 31 of multi-view video information. In other words, the third information extracting unit 23 may extract pixel information of the first block in the video frame of the first video. Further, the third information extracting unit 23 may extract pixel information of the second block in the video frame of the second video. The third information extracting unit 23 may calculate a similarity value from the pixel information of the first block and the second block.

Steps S201 to S203 which have been described above may be processes for extracting training data of the disparity compensation model 31. The training data may be used as learning data of the disparity compensation model 31.

In step s204, the disparity compensation model 31 may be generated using a machine learning algorithm based on a depth information similarity value, a motion estimation value, and a pixel information similarity value. In this case, the machine learning algorithm may include a support vector machine (SVM). According to one embodiment of the present disclosure, in step S204, the disparity compensation model 31 may be generated with the depth information similarity value, the motion estimation value, and the pixel information similarity value calculated in steps S201 to S203 as inputs.

In step S205, the decoder 30 may decode the video data that was photographed by the plurality of cameras 2 and encoded by using the disparity compensation model 31 of the multi-view video information. For example, the decoder 30 may decode the video data encoded by being photographed by the plurality of cameras 2 using the disparity compensation model 31 of the multi-view video information as video data to be decoded. For example, the decoder 30 may decode the video data which is photographed by the plurality of cameras 2 and encoded by an encoding apparatus (not illustrated) of multi-view video information using the disparity compensation model 31 of the multi-view video information.

According to one embodiment of the present disclosure, the decoder 30 may receive video data encoded from the decoding apparatus (not illustrated) of multi-view video information and decode the corresponding video data to output the decoded data. The decoder 30 extracts first information to third information from the received video data to input the extracted information to the disparity compensation model 31 of the multi-view video information to perform block matching between video frames of the plurality of videos and disparity compensation. In order to measure the redundancy between the plurality of videos, the decoder 30 extracts first information to third information and inputs the extract information to the disparity compensation model 31 of the multi-view video information to perform block matching between video frames of the plurality of videos and disparity compensation.

According to one embodiment of the present disclosure, the decoding apparatus 1 of multi-view video information may train and generate in advance the disparity compensation model 31 of multi-view video information using a machine learning algorithm based on the depth information similarity value, the motion estimation value, and the pixel information similarity value. The decoding apparatus 1 of multi-view video information may perform decoding using the disparity compensation model 31 of multi-view video information trained during the disparity compensation process.

Figure 6A:
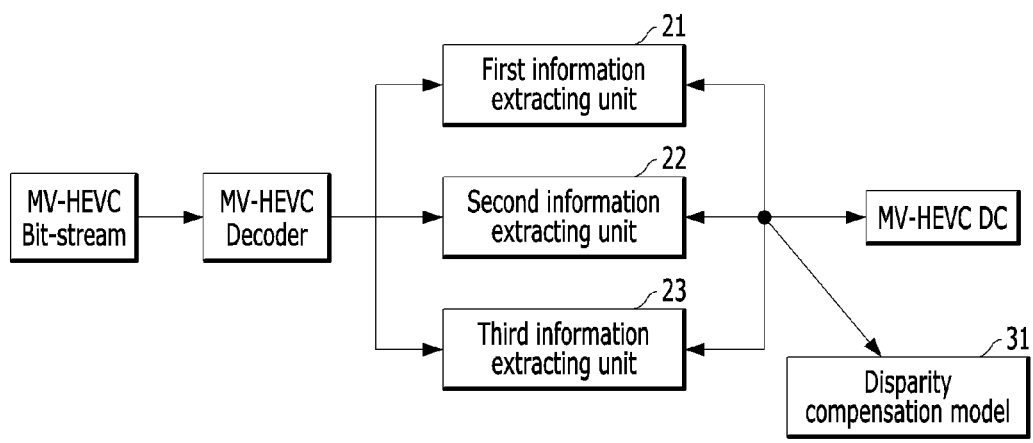
FIG. 6A is a view schematically illustrating a training process of a decoding apparatus of multi-view video information according to one embodiment of the present disclosure.

FIG. 6A is a view schematically illustrating a training process of a decoding apparatus of multi-view video information according to one embodiment of the present disclosure.

For example, referring to FIG. 6A, the decoding apparatus 1 of multi-view video information extracts three features (first information to third information) from a bit stream of MV-HEVC in view of training and compares the features with a position of the disparity compensation (DC). When the DC (disparity compensation) is the same as the position of unique values of three features (first information to third information), a label of the SVM (space vector model) is represented as 1 and in contrast (when the position of the unique value is not the same), the label of the SVM (space vector model) may be represented as 0. Further, a multi video which is compressed after encoding a multi-view video (MVV) sequence by capturing an actual scene using two or more cameras to train in the SVM may be sent to a decoder as a bit stream.

Figure 6B:
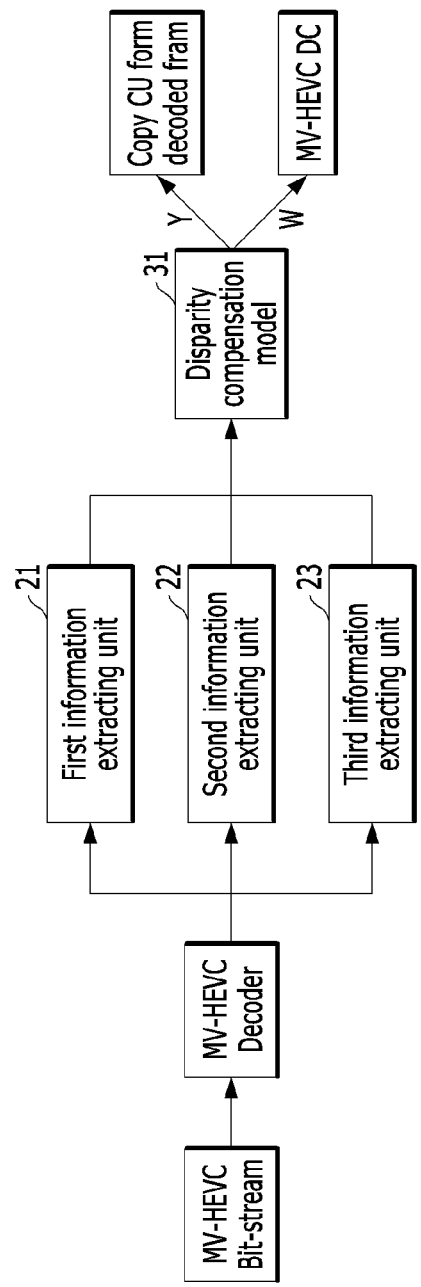
FIG. 6B is a view schematically illustrating a predicting process of a decoding apparatus of multi-view video information according to one embodiment of the present disclosure.

FIG. 6B is a view schematically illustrating a predicting process of a decoding apparatus of multi-view video information according to one embodiment of the present disclosure.

For example, referring to FIG. 6B, in the decoding apparatus 1 of multi-view video information, a decoder (MV-HEVC decoder) may normally decompress the encoded MV-HEVC bit stream which is photographed by the plurality of cameras 2. Further, the decoding apparatus 1 of multi-view video information may extract and predict three information (first information to third information) using the SVM prediction module (machine learning algorithm) at the beginning of processing the disparity compensation (DC). In this case, the first information extracting unit 21 may generate the first information by extracting depth information of a block in a video frame of a plurality of videos from video data included in the bit stream, the second information extracting unit 22 may generate the second information by determining whether the same motion estimation between video frames of the plurality of videos is generated, and the third information extracting unit 23 may generate the third information by extracting pixel information of a block in a video frame of the plurality of videos.

The decoding apparatus 1 of multi-view video information inputs the first information to the third information to the disparity compensation model of multi-view video information to perform the block matching between video frames of the plurality of videos and disparity compensation. In this case, when the decoding apparatus 1 of multi-view video information successfully predicts, the corresponding coding unit (CU) may be copied to a coding unit (CU) which is not compressed, at an independent view (camera 0). In contrast, when the decoding apparatus 1 of multi-view video information does not successfully predict, it may be processed as disparity compensation (DC).

Hereinafter, a decoding apparatus 1 of multi-view video information according to one embodiment and another embodiment of the present disclosure will be described. However, the decoding apparatus 1 of multi-view video information relates to a decoding apparatus 1 of multi-view video information which performs a decoding method of multi-view video information according to one embodiment of the present disclosure described above and another embodiment so that the decoding method of multi-view video information may include the same or corresponding decoding method of multi-view video information according to one embodiment of the present disclosure described above and another embodiment. Therefore, the same or similar components to those described above may be denoted by the same reference numerals and a redundant description may be simplified or omitted.

FIG. 2 is a schematic block diagram of a decoding apparatus of multi-view video information according to one embodiment of the present disclosure.

Referring to FIG. 2, the decoding apparatus 1 of multi-view video information according to one embodiment of the present disclosure may include a receiver 10, a feature extracting unit 20, and a decoder 30. For example, the decoding apparatus 1 of multi-view video information may be a computer, a server, or a device in which a software which performs the decoding of multi-view video information is installed, but is not limited thereto.

The receiver 10 may receive a bit stream related to video data of the plurality of videos photographed by the plurality of cameras 2.

The feature extracting unit 20 may extract feature information of a bit stream including depth information of a block in a video frame of a plurality of videos, information about motion estimation between video frames of the plurality of videos, and pixel information of a block in the video frame of the plurality of videos, from video data included in the bit stream.

According to one embodiment of the present disclosure, the feature extracting unit 20 may include a first information extracting unit 21, a second information extracting unit 22, and a third information extracting unit 23.

The first information extracting unit 21 may generate the first information by extracting depth information of a block in video frames of a plurality videos from video data included in the bit stream.

The second information extracting unit 22 may generate second information by determining whether the same motion estimation between video frames of the plurality of videos is generated.

The third information extracting unit 23 may generate the third information by extracting pixel information of a block in video frames of a plurality videos.

The decoder 30 includes a disparity compensation model 31 of multi-view video information generated by being trained in advance and inputs the extracted feature information to the disparity compensation model to perform block matching between video frames of the plurality of videos and disparity compensation.

Here, the disparity compensation model 31 may be generated using the machine learning algorithm based on a depth information similarity value calculated by extracting depth information of a block in a video frame of a plurality of videos from video data of the plurality of videos photographed by the plurality of cameras 3, a motion estimation value calculated by determining whether the same motion estimation between video frames of the plurality of videos is generated, and a pixel information similarity value calculated by extracting pixel information of a block in the video frame of the plurality of videos. In this case, the machine learning algorithm may include a support vector machine (SVM).

According to one embodiment of the present disclosure, the encoding apparatus (not illustrated) of multi-view video information may receive a plurality of video data photographed by the plurality of cameras 3. The encoding apparatus (not illustrated) of multi-view video information may receive a plurality of video data having different features of video data, different degrees of zoom-in/zoom-out, different views of a video camera, and different positions of cameras, from the plurality of video cameras 2. For example, the feature of the video data may include a resolution, a color, a similarity of background, a number of pixels, and a number of video frames. The encoding apparatus (not illustrated) of multi-view video information may encode video data received from the plurality of cameras 2. Further, the encoding apparatus (not illustrated) of multi-view video information may determine an encoding method of video data which is received in accordance with a feature of received video data, a view of the video camera, a degree of zoom-in/zoom-out, and a position of a camera.

In the above-description, steps S101 to S105 and S201 to S205 may be further divided into additional steps or combined as smaller steps depending on an implementation example of the present disclosure. Further, some steps may be omitted if necessary and the order of steps may be changed.

The decoding method of multi-view video information according to the embodiment of the present disclosure may be implemented as program instructions which may be executed by various computers to be recorded in a computer readable medium. The computer readable medium may include solely a program instruction, a data file, and a data structure or a combination thereof. The program instruction recorded in the medium may be specifically designed or constructed for the present invention or known to those skilled in the art of a computer software to be used. Examples of the computer readable recording medium include a magnetic media such as a hard disk, a floppy disk, or a magnetic tape, an optical media such as a CD-ROM or a DVD, a magneto-optical media such as a floptical disk, and a hardware device which is specifically configured to store and execute the program instruction, such as a ROM, a RAM, and a flash memory. Examples of the program instruction include not only a machine language code which is created by a compiler but also a high level language code which may be executed by a computer using an interpreter. The hardware device may operate as one or more software modules in order to perform the operation of the present invention and vice versa.

Further, the above-described decoding method of multi-view video information may also be implemented as a computer program or an application executed by a computer which is stored in a recording medium.

The above-description of the present disclosure is illustrative only and it is understood by those skilled in the art that the present disclosure may be easily modified to another specific type without changing the technical spirit or an essential feature of the present disclosure. Thus, it is to be appreciated that the embodiments described above are intended to be illustrative in every sense, and not restrictive. For example, each component which is described as a singular form may be divided to be implemented and similarly, components which are described as a divided form may be combined to be implemented.

The scope of the present disclosure is represented by the claims to be described below rather than the detailed description, and it is to be interpreted that the meaning and scope of the claims and all the changes or modified forms derived from the equivalents thereof come within the scope of the present disclosure.

The invention claimed is:

1. A decoding method of multi-view video information, comprising:
   receiving a bit stream about video data of a plurality of videos photographed by a plurality of cameras;
   generating first information by extracting depth information of a block in a video frame of a plurality of videos from video data included in the bit stream;
   generating second information by determining whether the same motion estimation is generated between video frames of the plurality of videos;
   generating third information by extracting pixel information of a block in the video frame of the plurality of videos; and
   performing block matching and disparity compensation between video frames of the plurality of videos by inputting the first information to third information to a disparity compensation model of multi-view video information which is generated by being trained in advance.

2. The decoding method of multi-view video information of claim 1, further comprising:
   calculating a depth information similarity value by extracting depth information of a block in video frames of a plurality of videos from video data of the plurality of videos photographed by a plurality of cameras;
   calculating a motion estimation value by determining whether the same motion estimation is generated between the video frames of the plurality of videos;
   calculating a pixel information similarity value by extracting pixel information of the block in the video frame of the plurality of videos; and
   generating a disparity compensation model of multi-view video information which is trained in advance, using a machine learning algorithm, based on the depth information similarity value, the motion estimation value, and the pixel information similarity value.

3. The decoding method of multi-view video information of claim 2, wherein the machine learning algorithm includes a support vector machine (SVM).

4. The decoding method of multi-view video information of claim 2, wherein the depth information in the video frame of the plurality of videos includes size information of a coding unit (CU) from 64×64 to 8×8 of each block in the video frame or information about a tree structure.

5. The decoding method of multi-view video information of claim 2, wherein in the calculating of a motion estimation value by determining whether the same motion estimation is generated between video frames of the plurality of videos, when the prediction unit of the corresponding blocks between video frames is the same, it is determined that the same motion estimation between the video frames is generated to assign a predetermined motion estimation value.

6. A decoding method of multi-view video information, comprising:
   calculating a depth information similarity value by extracting depth information of the block in video frames of a plurality of videos from video data of the plurality of videos photographed by a plurality of cameras;
   calculating a motion estimation value by determining whether the same motion estimation is generated between video frames of the plurality of videos;
   calculating a pixel information similarity value by extracting pixel information of the block in the video frame of the plurality of videos;
   generating a disparity compensation model of multi-view video information which is trained in advance, using a machine learning algorithm, based on the depth information similarity value, the motion estimation value, and the pixel information similarity value; and
   decoding the video data encoded by being photographed by the plurality of cameras using a disparity compensation model of the multi-view video information.

7. The decoding method of multi-view video information of claim 6, wherein the machine learning algorithm includes a support vector machine (SVM).

8. The decoding method of multi-view video information of claim 6, wherein the decoding of video data includes:
   receiving a bit stream about encoded video data photographed by a plurality of cameras;
   generating first information by extracting depth information of a block in a video frame of a plurality of videos from video data included in the bit stream;
   generating second information by determining whether the same motion estimation is generated between video frames of the plurality of videos;
   generating third information by extracting pixel information of a block in the video frame of the plurality of videos; and
   performing block matching and disparity compensation between video frames of the plurality of videos by inputting the first information to third information to a disparity compensation model of multi-view video information.

9. A decoding apparatus of multi-view video information, comprising:
   a receiver which receives a bit stream about video data of a plurality of videos photographed by a plurality of cameras;
   a feature extracting unit which extracts feature information of a bit stream including depth information of a block in a video frame of a plurality of videos, information about motion estimation between video frames of the plurality of videos, and pixel information of a block in the video frame of the plurality of videos, from video data included in the bit stream; and
   a decoder which includes a disparity compensation model of multi-view video information generated by being trained in advance and performs block matching and disparity compensation between video frames of the plurality of videos by inputting the extracted feature information to the disparity compensation model.

10. The decoding apparatus of multi-view video information of claim 9, wherein the disparity compensation model is generated using a machine learning algorithm based on a depth information similarity value calculated by extracting depth information of a block in a video frame of a plurality of videos from video data of the plurality of videos photographed by the plurality of cameras, a motion estimation value calculated by determining whether the same motion estimation between video frames of the plurality of videos is generated, and a pixel information similarity value calculated by extracting pixel information of a block in the video frame of the plurality of videos.

11. The decoding apparatus of multi-view video information of claim 10, wherein the feature extracting unit includes:
   a first information extracting unit which generates first information by extracting depth information of a block in a video frame of a plurality of videos from video data included in the bit stream;
   a second information extracting unit which generates second information by determining whether the same motion estimation is generated between video frames of the plurality of videos; and
   a third information extracting unit which generates third information by extracting pixel information of a block in the video frame of the plurality of videos.

12. The decoding apparatus of multi-view video information of claim 10, wherein the machine learning algorithm includes a support vector machine (SVM).

13. A non-transitory computer readable recording medium in which a program allowing a computer to execute the method of claim 1 is recorded.

* * * * *